United States Patent
Rivas et al.

(10) Patent No.: US 8,294,288 B2
(45) Date of Patent: Oct. 23, 2012

(54) COLLECTOR ANTI-WEARING AND LUBRICATION SYSTEM FOR VARIABLE SPEED WIND TURBINE

(75) Inventors: Gregorio Rivas, Pampona (ES); Iker Garmendia, Ondarroa (ES); Josu Elorriaga, Plencia (ES); Jesus Mayor, Pamplona (ES); Javier Perez Barbachano, Pamplona (ES); David Sole, Pamplona (ES); Jorge Acedo, Pamplona (ES)

(73) Assignee: Ingeteam Power Technology, S.A., Navarra (ES)

( * ) Notice: Subject to any disclaimer, the term of this patent is extended or adjusted under 35 U.S.C. 154(b) by 831 days.

(21) Appl. No.: 12/293,352

(22) PCT Filed: Feb. 28, 2007

(86) PCT No.: PCT/IB2007/002783
§ 371 (c)(1), (2), (4) Date: Jan. 26, 2009

(87) PCT Pub. No.: WO2007/141669
PCT Pub. Date: Dec. 13, 2007

(65) Prior Publication Data
US 2011/0057443 A1    Mar. 10, 2011

Related U.S. Application Data

(60) Provisional application No. 60/783,089, filed on Mar. 17, 2006.

(51) Int. Cl.
*H02P 9/04* (2006.01)
*H02J 3/42* (2006.01)

(52) U.S. Cl. ........................................................ 290/44
(58) Field of Classification Search ..................... 290/44
See application file for complete search history.

(56) References Cited

U.S. PATENT DOCUMENTS

| | | | |
|---|---|---|---|
| 3,558,904 A | | 1/1971 | Kanngiesser |
| 4,160,170 A | * | 7/1979 | Harner et al. ................. 290/44 |
| 4,297,076 A | | 10/1981 | Donham et al. |
| 4,339,666 A | * | 7/1982 | Patrick et al. ................. 290/44 |

(Continued)

FOREIGN PATENT DOCUMENTS

CA         2 537 999 A1    4/2005

(Continued)

OTHER PUBLICATIONS

Hansen L H et al: "Generators and power electronics technology for wind turbines"; IECON '01; Proceedings of the 27th Annual Conference of the IEEE Industrial Electronics Society; Denver, CO; Nov. 29-Dec. 2, 2001; [Annual Conference of the IEEE Industrial Electronics Society], New York, NY: IEEE, US, vol. 3, Nov. 29, 2001, pp. 2000-2005; XP010571723.

(Continued)

*Primary Examiner* — Burton Mullins
(74) *Attorney, Agent, or Firm* — Sughrue Mion, PLLC

(57) ABSTRACT

A variable speed wind turbine having a doubly fed induction generator (DFIG), includes an exciter machine mechanically coupled to the DFIG and a power converter placed between a rotor of the DFIG and the exciter machine. Thus, the power converter is not directly connected to the grid avoiding the introduction of undesired harmonic distortion and achieving a better power quality fed into the utility grid. Moreover, the variable speed wind turbine includes a power control and a pitch regulation.

8 Claims, 11 Drawing Sheets

U.S. PATENT DOCUMENTS

| | | | |
|---|---|---|---|
| 4,426,192 A * | 1/1984 | Chertok et al. | 416/1 |
| 4,435,647 A * | 3/1984 | Harner et al. | 290/44 |
| 4,584,486 A * | 4/1986 | Quynn | 290/44 |
| 4,656,362 A * | 4/1987 | Harner et al. | 290/44 |
| 4,701,691 A | 10/1987 | Nickoladze | |
| 4,994,684 A | 2/1991 | Lauw et al. | |
| 5,028,804 A | 7/1991 | Lauw | |
| 5,083,039 A | 1/1992 | Richardson et al. | |
| 5,225,712 A | 7/1993 | Erdman | |
| 5,239,251 A | 8/1993 | Lauw | |
| 5,798,631 A | 8/1998 | Spee et al. | |
| 5,907,192 A | 5/1999 | Lyons et al. | |
| 6,072,303 A | 6/2000 | Nickoladze et al. | |
| 6,137,187 A | 10/2000 | Mikhail et al. | |
| 6,278,211 B1 | 8/2001 | Sweo | |
| 6,310,417 B1 | 10/2001 | Hsu | |
| 6,420,795 B1 | 7/2002 | Mikhail et al. | |
| 6,448,735 B1 | 9/2002 | Gokhale et al. | |
| 6,492,801 B1 | 12/2002 | Sims et al. | |
| 6,566,764 B2 | 5/2003 | Rebsdorf et al. | |
| 6,600,240 B2 | 7/2003 | Mikhail et al. | |
| 6,741,059 B2 | 5/2004 | Gokhale et al. | |
| 6,783,326 B2 * | 8/2004 | Weitkamp et al. | 416/1 |
| 6,847,128 B2 | 1/2005 | Mikhail et al. | |
| 6,853,038 B2 | 2/2005 | Hayashi | |
| 6,853,094 B2 | 2/2005 | Feddersen et al. | |
| 6,856,039 B2 | 2/2005 | Mikhail et al. | |
| 6,856,040 B2 | 2/2005 | Feddersen et al. | |
| 6,856,041 B2 | 2/2005 | Siebenthaler et al. | |
| 6,921,985 B2 | 7/2005 | Janssen et al. | |
| 6,933,625 B2 | 8/2005 | Feddersen et al. | |
| 7,038,330 B2 | 5/2006 | Rosebrock et al. | |
| 7,042,110 B2 | 5/2006 | Mikhail et al. | |
| 7,102,247 B2 | 9/2006 | Feddersen | |
| 7,324,359 B2 | 1/2008 | Schreiber | |
| 7,452,185 B2 * | 11/2008 | Ide et al. | 416/35 |
| 7,615,904 B2 | 11/2009 | Tupper et al. | |
| 7,692,322 B2 * | 4/2010 | Wakasa et al. | 290/44 |
| 2002/0105189 A1 | 8/2002 | Mikhail et al. | |
| 2003/0151259 A1 | 8/2003 | Feddersen et al. | |
| 2004/0217594 A1 | 11/2004 | Feddersen et al. | |
| 2004/0217595 A1 | 11/2004 | Feddersen et al. | |
| 2004/0222642 A1 | 11/2004 | Siebenthaler et al. | |
| 2005/0012339 A1 | 1/2005 | Mikhail et al. | |
| 2005/0122083 A1 | 6/2005 | Erdman et al. | |
| 2005/0151520 A1 | 7/2005 | Schreiber | |
| 2005/0253396 A1 | 11/2005 | Mikhail et al. | |
| 2006/0113801 A1 * | 6/2006 | Schubert et al. | 290/44 |
| 2006/0163881 A1 | 7/2006 | Bucker et al. | |
| 2006/0192390 A1 | 8/2006 | Juanarena Saragueta et al. | |
| 2006/0238929 A1 | 10/2006 | Nielsen | |
| 2006/0267560 A1 | 11/2006 | Rajda et al. | |
| 2011/0141773 A1 | 6/2011 | Larsen et al. | |

FOREIGN PATENT DOCUMENTS

| | | |
|---|---|---|
| DE | 197 39 164 A1 | 3/1999 |
| EP | 1 286 048 A1 | 2/2003 |
| GB | 2 410 386 A | 7/2005 |
| GB | 2 411 252 A | 8/2005 |
| WO | 01/25628 A2 | 4/2001 |
| WO | 03/058789 A1 | 7/2003 |
| WO | 2004/040748 A1 | 5/2004 |
| WO | 2004/070936 A1 | 8/2004 |
| WO | 2004/079891 A1 | 9/2004 |
| WO | 2004/098261 A2 | 11/2004 |
| WO | 2004/107556 A1 | 12/2004 |
| WO | 2005/015012 A1 | 2/2005 |
| WO | 2005/027301 A1 | 3/2005 |
| WO | 2005/031160 A2 | 4/2005 |
| WO | 2005/099063 A1 | 10/2005 |
| WO | 2005/113964 A1 | 12/2005 |
| WO | 2006/069569 A1 | 7/2006 |

OTHER PUBLICATIONS

Lie Xu, Bjarne R. Andersen: "Grid connection of large offshore wind farms using HVDC"; Wind Energy [Online]; Dec. 1, 2005; XP002524788.

Khatounian F et al: "Design of an Output LC Filter for a Doubly Fed Induction Generator Supplying Non-linear Loads for Aircraft Applications" Industrial Electronics, 2004 IEEE International Symposium on Ajaccio, France May 4-7, 2004, Piscataway, NJ, USA, IEEE, May 4, 2004, pp. 1093-1098, XP010874479.

Khatounian F et al.: "Control of a Doubly Fed Induction Generator for Aircraft Application"; XP010691573, 2003.

Nishio T et al.: "Control Characteristics of an Adjustable Speed Generation System With a Flywheel Excited by a DC Link Convertor"; XP000792358, 1997.

Arsudis, Doppeltgespeister Drehstromgenerator mit Spannungszwischenkreis-Umrichter im Rotorkeis fur Windkraftanlagen, Dissertation; pp. 1-163, 1989.

Andreas Petersson, Analysis, Modeling and Control of Doubly-Fed Induction Generators for Wind Turbines, Goteborg, Sweden 2005, pp. 1-166.

Matsuzaka et al., EWEC'89, European Wind Energy Conference and Exhibition, pp. 608-612, 1989.

A. Ansel, et al.; "Modelling and Simulation of an Autonomous Variable Speed Micro Hydropower Station"; XP-002467010; Apr. 17, 2006; pp. 321-332.

P. Bauer, et al.; "Evaluation of Electrical Systems for Offshore Windfarms"; XP010521303; Industry Applications Conference, Conference Record of the 2000 IEEE; Oct. 2000, pp. 1416-1423; vol. 3; Piscataway, NJ, USA.

Nicolas Patin, et al.; "Analysis and Control of a Cascaded Doubly-Fed Induction Generator"; Industrial Electronics Society; 32nd Annual Conference of IEEE; Nov. 2005; pp. 2487-2492; USA.

* cited by examiner ns of the local grid voltage, such as a change of the steady state voltage level, dynamic voltage variations, flicker, an injection of currents with non-sinusoidal waveforms (i.e. harmonics), and the like.

COLLECTOR ANTI-WEARING AND LUBRICATION SYSTEM FOR VARIABLE SPEED WIND TURBINE

CROSS-REFERENCE TO RELATED APPLICATION

This application is claims priority from U.S. application Ser. No. 11/477,593 filed Jun. 30, 2006 and U.S. Provision Application No. 60/783,029, filed on Mar. 17, 2006, the disclosures of which are incorporated herein in their entirety by reference.

BACKGROUND OF THE INVENTION

1. Field of the Invention

The present invention is related to the field of variable speed wind turbines, and, more particularly, to a variable speed wind turbine comprising a doubly fed induction generator (DFIG), an exciter machine, an intermediate static converter not connected to the grid, power control and pitch regulation.

2. Description of the Prior Art

In the last few years, wind power generation has increased considerably worldwide. This growth is widely forecast to continue into the next decades, even as the industry and technology have arisen to a mature level in this field. As wind farms grow in size and the total base of installed wind capacity continues to increase, the importance of improving the quality of power output becomes a challenge of huge importance to wind developers and utility customers alike.

Electric power transmission is one process in the delivery of electricity to consumers. A power transmission system is often referred to as a "grid". Transmission companies must meet the challenge of getting the maximum reliable capacity from each transmission line. However, due to system stability considerations, the actual capacity may be less than the physical limit of the line. Thus, good clean sources of electrical power are needed to improve system stability.

In most applications, wind turbines generate electric power and feed current into the electric grid. This may cause deviations of the local grid voltage, such as a change of the steady state voltage level, dynamic voltage variations, flicker, an injection of currents with non-sinusoidal waveforms (i.e. harmonics), and the like.

These effects can be undesirable for end-user equipment and other generators or components connected to the grid, such as transformers. As the power capacity increases, an evident need arises for improving the power quality characteristics of the turbine output. The power quality impact of a wind turbine depends on the technology involved with it. Despite this fact, wind turbines manufacturers did not consider the power quality as a main design feature.

Originally, the first wind turbines were designed to work at a fixed rotational speed. According to this model, the wind turbine's generator is directly connected to the grid and operates at a determined speed, allowing very minor speed variations. In the case of an asynchronous generator, only the slip range of the generator is allowed. The slip being the difference in the rotation speed of the rotor as compared to the rotating magnetic field of the stator. The generator's slip varies slightly with the amount of generated power, and it is therefore not entirely constant. Furthermore, these wind turbines need starting current limitation strategies and reactive energy compensation elements during normal operation. Wind turbulence produces a non-desirable torque variation which is directly transmitted to the wind turbine's drive train and, hence, to the active power fed to the electrical grid.

A type of wind turbine that keeps the rotational generator speed proportional to the wind speed, is a variable speed wind turbine. In order to obtain the maximum efficiency of the wind turbine, the generator rotational speed adapts to the fluctuating wind speed. This type of wind turbine includes power electronic converters that are connected to the grid. Due to this kind of interface, harmonic emissions from the turbine's power electronic converters are fed into the grid.

Presently wind turbines of the variable speed type using power electronic converters have become widespread. Examples of this variable speed wind turbine are described in U.S. Pat. No. 5,083,039, U.S. Pat. No. 5,225,712 or U.S. Published Application 2005/0012339. These turbines, based on a full converter system, include a generator, a converter on the generator side, a DC link Bus, and an active converter connected to the grid. The variable frequency energy of the generator is transferred to the DC link Bus by the generator side converter, and later transformed to a fixed frequency by the grid side active converter. Some disadvantages are common to all full converter systems. The active switching of the semiconductors of the grid side converter injects undesirable high frequency harmonics to the grid. To avoid the problems caused by these harmonics, a number of filters must be installed. Furthermore, due to the different impedance values on the grid and previously existing harmonics, different tuning of the filters is required according to the characteristics of the wind farm location.

Another variable speed wind turbine is described in the U.S. Pat. No. 6,137,187. As shown in FIG. 1, this wind turbine configuration includes a doubly fed induction generator (1), a power converter (4) comprising an active converter on the rotor side (5), a DC Bus (8), and an active converter on the grid side (7). In this configuration, only a minor part of the total power is transferred through the converters (5, 7) to the grid (9). Power can be delivered to the grid (9) directly by the stator (3), whilst the rotor (2) can absorb or supply power to the grid (9) via the power converter (4) depending on whether the doubly fed induction generator is in subsynchronous or supersynchronous operation. Variable speed operation of the rotor has the advantage that many of the faster power variations are not transmitted to the network but are smoothed by the flywheel action of the rotor. However, the use of power electronic converters (4) connected to the grid (9) causes harmonic distortion of the network voltage.

Other documents also describe variable speed wind turbines. For example, U.S. Pat. No. 6,933,625 describes a variable speed system which includes a doubly fed induction generator, a passive grid side rectifier with scalar power control and dependent pitch control. In this case, there is an active converter on the rotor side, a passive grid side rectifier and a switchable power dissipating element connected on the DC link Bus. During supersynchronous operation the energy extracted from the rotor is dissipated in the switchable power dissipating element, reducing the efficiency of the wind turbine; during the operation of the wind turbine in the subsynchronous mode, the energy is rectified by the passive grid side rectifier which causes undesirable low frequency harmonics in the grid. Thus, complex attenuation filters are required. U.S. Pat. No. 6,566,764 and U.S. Pat. No. 6,856,038 describe variable speed wind turbines having a matrix converter. Both cases include power electronic converters connected to the grid, which may cause undesired harmonic voltages.

All the previously mentioned U.S. Patents and other existing solutions on variable speed wind turbines that include power electronics have converters connected to the grid.

Depending on the technology used on the converters, there are different ranges of harmonics introduced on the grid which must be attenuated by using filters, and tuned to the final application location, making the systems more expensive and less reliable.

In view of these problems in the prior art, there is a need to provide an improved power solution, which may be applied to variable speed wind turbines.

Another undesirable problem, especially in the case of weak grids, is the reactive power consumption during the synchronization of the generator. For example, a synchronization method is described in the U.S. Pat. No. 6,600,240. This method starts connecting the generator stator to the grid while the power converter is disabled and the rotor has reached a predefined speed. At this moment, the full magnetizing current is supplied by the grid, which causes a reactive power consumption. This reactive power consumption is sometimes not allowed by some new grid compliance regulations. This patent also describes a disconnection process. The process starts reducing the rotor current and disabling the rotor converter. In this moment, the reactive magnetizing current is supplied by the grid. To disconnect the generator the contactor is opened with reactive current, decreasing the operational life of the contactor. Accordingly, there is a need to provide a method for synchronization, connection and disconnection to the grid of the doubly fed induction generator, which avoids the consumption of reactive power and increases the lifetime of connecting devices.

Another aspect that determines the power quality injected to the grid is the control of the generator. One type of control of the generator side converter is known as "field orientated control" (FOC). The FOC method is based on the electrical model and the parameters of the machine. Due to the dispersion of the machine parameters, the torque can not be accurately calculated, and additional online adjusting loops are required. Moreover, the FOC method that is used introduces delays in the flux position identification when a fault occurs in the grid, making it more difficult to fulfill the new grid compliance requirements.

In prior art variable speed wind turbines with DFIG configuration, although the stator power remains constant, the rotor power is also fed into the grid through the power converter. Due to the rotor power ripple, the total power fed into the grid is also rippled, affecting the output power quality of the wind turbine.

Variable speed wind turbines, which only use a doubly fed induction generator, cannot use electric braking. As described above, in this kind of configuration, power is delivered to the grid directly by the stator, and a minor part of the total power is transferred from the rotor to the grid through the converters. When an incidental stop of the wind turbine occurs, for example during a persistent fault in the grid, the generator's power decreases sharply. Only fast non-electrical braking, such as blade pitching, can be applied to stop the wind turbine. This operation mode produces great mechanical strengths in wind turbine components, which may cause premature damages. Thus, there exists a need for additional braking to prevent this mechanical stress.

The use of high voltage DC link transmission (HVDC) in wind farms is described in Patent No. WO01/25628, which includes a synchronous generator as the main generation device. Due to the use of synchronous machines, the output frequency varies with the wind, so especially at low wind conditions, the ripple content of the output DC voltage becomes high. Furthermore, the output transformer and rectifier must be oversized because they must be able to operate at low frequency. Additional details, such as special construction of the rotor circuitry with low inductance, are mandatory for the accurate regulation of the output power.

SUMMARY OF THE INVENTION

According to one aspect of an exemplary embodiment of the present invention, there is provided a variable speed wind turbine with a doubly fed induction generator, having at least one or more blades, one or more generators, one or more exciter machines coupled to the drive train, one or more active power electronic converters joined by a DC link Bus with one of the AC side connected to the rotor circuit of the doubly fed induction generator, and the other AC side connected to the exciter machine. The invention also describes a power control and a pitch regulation.

According to this aspect of a non-limiting exemplary embodiment of the invention, power electronics are not connected to the grid. Thus, power is only delivered to the grid through the stator of the doubly fed induction generator, avoiding undesired harmonic distortion, and achieving a better power quality to feed into the utility grid. Moreover, the use of complex filters and their tuning according to different locations may be avoided, making the system more economical and reliable.

Another aspect of an embodiment of the present invention is that power output remains constant above rated speed avoiding power fluctuations dependent on speed changes. Due to the topology of the invention, power is only delivered to the grid through the stator of the doubly fed induction generator. Thus, the rotor power ripple is avoided and the output power quality of the wind turbine is improved.

Another aspect of an exemplary embodiment of the present invention describes a variable speed wind turbine that uses Grid Flux Orientation (GFO) to accurately control the power injected to the grid. An advantage of this control system is that it does not depend on machine parameters, which may vary significantly, and theoretical machine models, avoiding the use of additional adjusting loops and achieving a better power quality fed into the utility grid.

A further aspect of an exemplary embodiment of the present invention is that the method for synchronization of the doubly fed induction generator avoids the consumption of reactive power during the connection and disconnection to/from the grid, complying with the new grid compliance regulations. Moreover, this method may avoid connection current peaks through connecting devices, increasing the lifetime of such components.

A further aspect of an exemplary embodiment of the present invention provides a control method to avoid the "wearing" of the collector of a DC motor when used to drive the pitch movement of the blade and improves the lubrication of the bearings of the blades.

Another aspect of an exemplary embodiment of the present invention is that in the case of an incidental stop of the wind turbine, although a doubly fed induction generator is used, it is possible to apply electric braking. In the event of an emergency, such as a persistent grid fault, an incidental stop of the wind turbine may happen. Then, the exciter machine is used as generator and power can be transferred from exciter machine to direct current Bus. Then, the electric brake may be activated and part of the electric power is drained in the rheostat of the chopper helping the generator to stop progressively and avoiding great mechanical strengths in wind turbine components.

Another aspect of the present invention is that it can be used for high voltage DC link transmission (HVDC) in variable speed generation systems.

According to another aspect, due to the topology of the present invention, the output frequency of the AC voltage may be fixed, allowing a smaller dimensioning of required rectifiers and transformers, and reducing the ripple content of the DC output voltage under low wind conditions, improving the output power quality.

It is to be understood that both the foregoing general description and the following detailed description are exemplary and explanatory only and are not restrictive of the invention, as claimed.

BRIEF DESCRIPTION OF THE DRAWINGS

The incorporated drawings constitute part of one or more embodiments of the invention. However, they should not be taken to limit the invention to the specific embodiment. The invention and its mode of operation will be more fully understood from the following detailed description when taken with the incorporated drawings in which.

DETAILED DESCRIPTION

A variable speed wind turbine according to various exemplary embodiments is described below. Several drawings will be referenced only as illustration for the better understanding of the description. Furthermore, the same reference numbers will be used along the description referring to the same or like parts.

Overview

Generally, the variable speed wind turbine generator according to various exemplary embodiments of the present invention channels the electrical power generated by the rotor during super synchronous operation of the doubly fed induction generator, to an exciter machine. The exciter machine then converts this electrical energy back into mechanical rotation energy, which can then be used to further increase the electrical power generated by the stator that is delivered to the grid. Electrical power is only delivered to the grid by the stator of the DFIG avoiding the delivery of power to the grid through power converters. Thus, the quality of the electrical power supplied to the grid is improved.

Additionally, during sub synchronous operation, when the rotor, instead of generating electrical power, requires an electrical power source, a portion of the rotational energy generated by the wind is used by the exciter machine to generate the electrical power required by the rotor.

Figure 1:
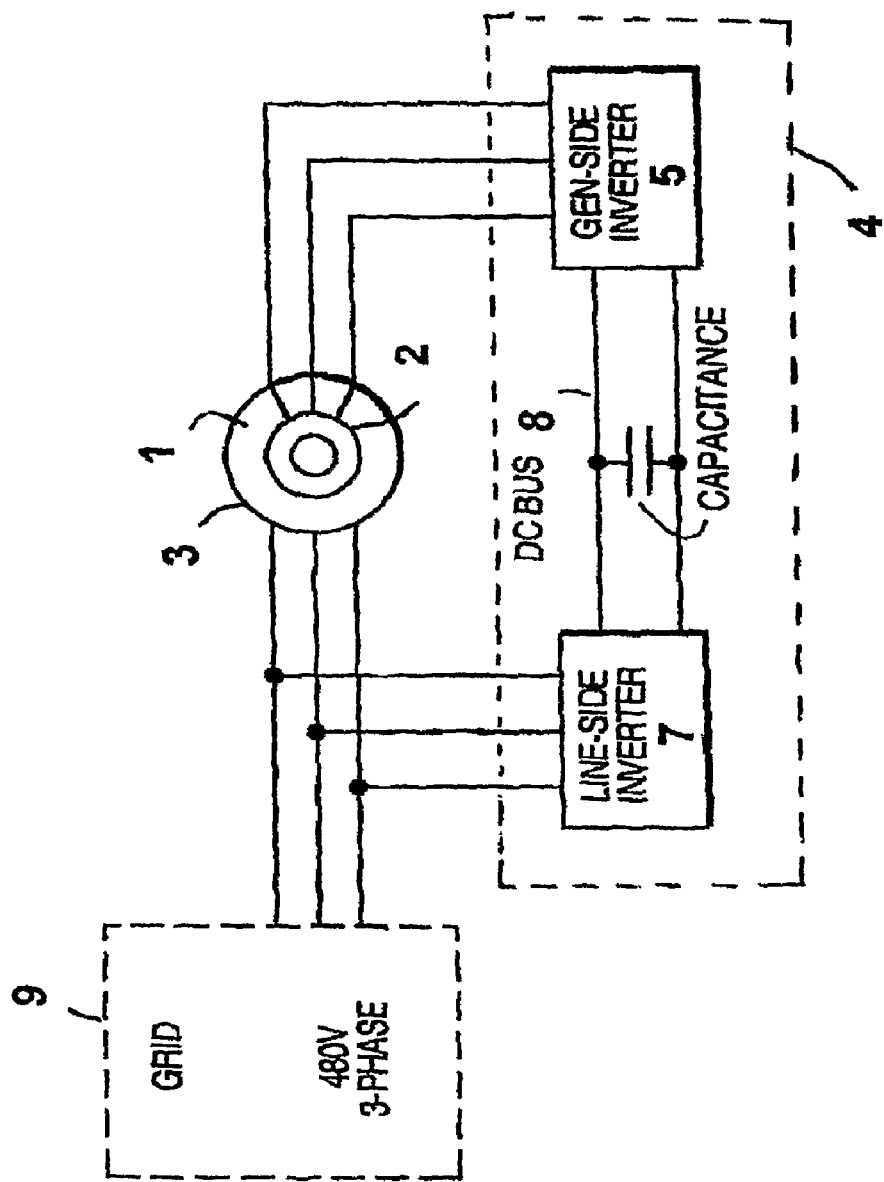
FIG. 1: Illustrates a conventional variable speed wind turbine system with doubly fed induction generator and power converters connected to the grid.
Figure 2:
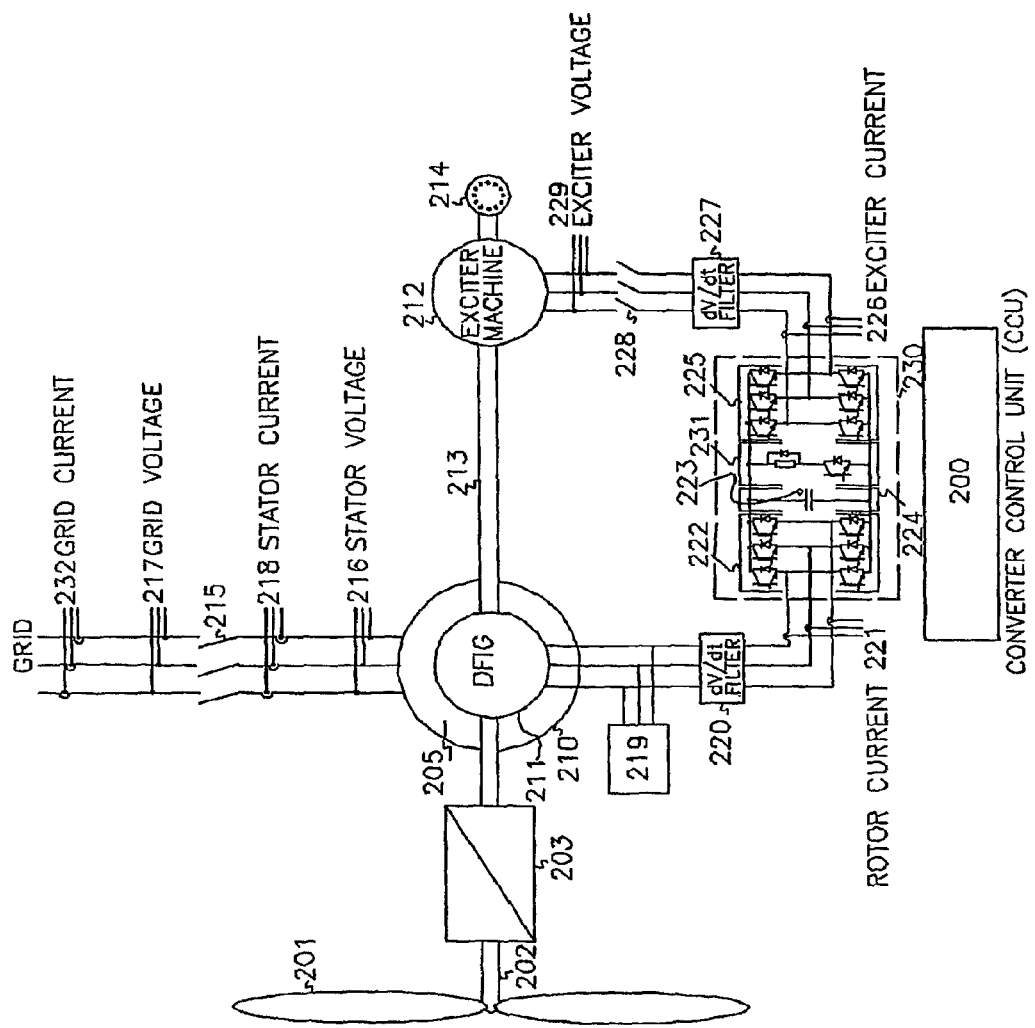
FIG. 2: Illustrates one implementation of a circuit diagram for a variable speed wind turbine having an exciter machine and a power converter not connected to the grid according to one exemplary embodiment.

The variable speed wind turbine generator system is broadly shown in FIG. 2. In this embodiment, the variable speed system comprises one or more rotor blades (201), a rotor hub which is connected to a drive train. The drive train mainly comprises a turbine shaft (202), a gearbox (203), and a doubly fed induction generator (205). The stator of the doubly fed induction generator (210) can be connected to the grid by using one or more contactors (215). The system also comprises an exciter machine (212) such as an asynchronous machine, a DC machine, a synchronous (e.g. permanent magnet) machine, or a reversible electrical machine that functions as either a motor or a generator, which is mechanically coupled to the drive train and two active electronic power converters (222, 225) joined by a DC link Bus (224) (i.e. a back to back converter) with one of the AC side connected to the rotor circuit of the doubly fed induction generator and the other AC side connected to the exciter machine (212). The active power converter (225) which regulates the exciter machine is not connected to the grid, such that the active power converter is isolated from the grid. Alternatively, a cycloconverter, a matrix converter or any other kind of bi-directional converter may be connected instead of a back to back converter. The system could also comprise an electric brake circuit (231), such a DC chopper, connected to the DC Bus. The converter control unit (CCU) (200) carries out the power regulation of the doubly fed induction generator and the exciter machine. The system comprises filters such a dV/dt filter (220) which is connected to the rotor circuit of the doubly fed induction generator in order to protect it against abrupt voltage variations produced by the active switches of the power electronic converter. Furthermore, a dV/dt filter (227) is connected between the electronic power converter and the exciter machine. In one embodiment, a protection module (219) against grid faults is connected to the rotor of the doubly fed induction generator.

The variable speed wind turbine generator system described in this embodiment can work below the synchronous speed (i.e. subsynchronous) and above the synchronous speed (i.e. supersynchronous). During the subsynchronous operation, power flows from the exciter machine (212) to the rotor (211) of the doubly fed induction generator (205), so the exciter machine (212) acts as a generator. On the other hand, during the supersynchronous operation, the power flows from the rotor (211) of the doubly fed induction generator (205) to the exciter machine (212), therefore the exciter machine acts as a motor. The power balance during the whole range speed is such that power generated/consumed in the exciter machine (212) is consumed/generated in the rotor (211) of the doubly fed induction machine, except for the losses in the different elements.

Due to the topology of the variable speed wind turbine generator system described, power is only delivered to the grid through the stator (210) of the doubly fed induction generator (205). There is no electronic power converter connected to the grid. Consequently, undesired harmonic distortion is avoided and a better power quality to feed into the utility grid is achieved. Moreover, the use of complex filters and their tuning demands according to different locations is also avoided, making the system more economical and reliable.

This topology also allows the use of an electric brake in a doubly fed induction generator configuration. In case of a wind turbine emergency stop due, for example, to a full blackout of the grid, the stator is disconnected and power produced by the generator can not be fed into the grid. However, the exciter machine (212) can be used as generator, and hence power can be transferred from the exciter machine (212) to the direct current Bus (224). Therefore, part of the electric power is drained in the rheostat of the chopper. Finally, mechanical or aerodynamic brake, such as blade pitching, is applied to stop the wind turbine. This embodiment of the present invention allows the generator to apply electric brake in a DFIG configuration, helping the wind turbine to stop and avoiding great mechanical strengths in wind turbine components, which may cause premature damage.

Figure 3:
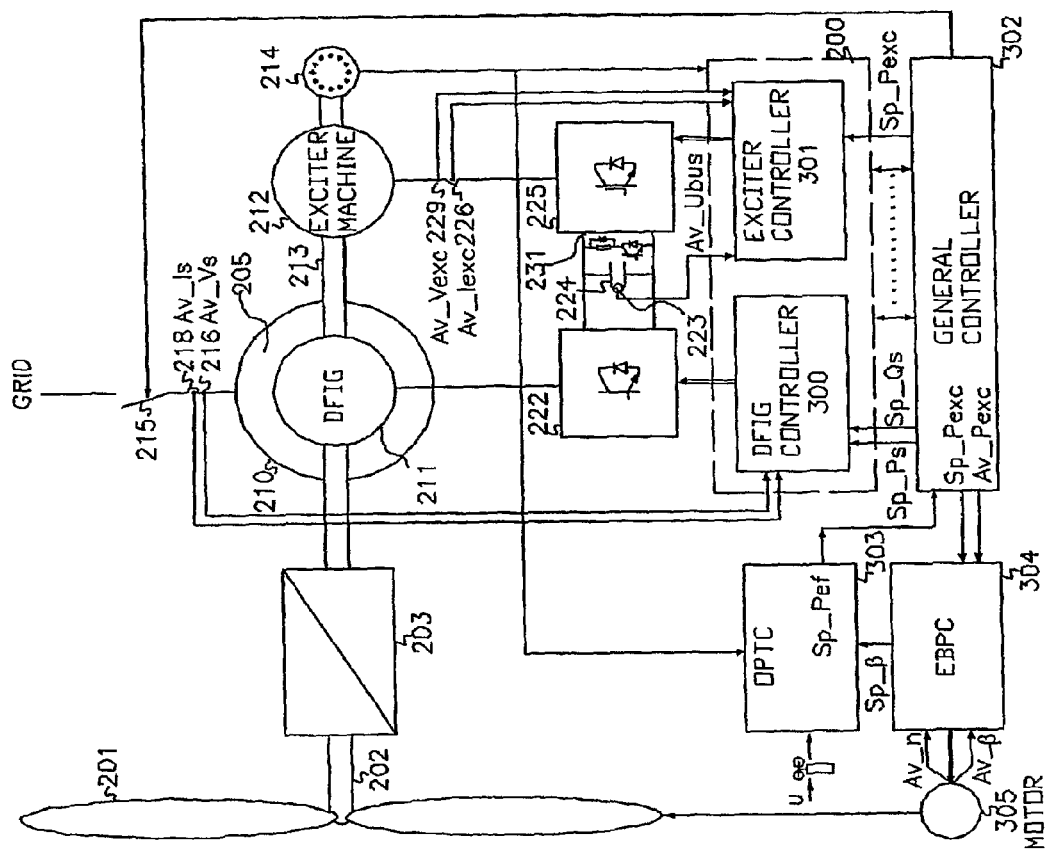
FIG. 3: Illustrates a block diagram of a power control and a pitch control for a variable wind speed turbine.

The variable speed wind turbine control system, as shown in FIG. 3, comprises a general controller (302), power controllers and a pitch regulator. The power set point is calculated by the Optimum Power Tracking Controller (OPTC) (303) based on measured wind speed. This set point is sent to the General Controller (302) and hence to DFIG Controller (300). The power delivered to the grid by the doubly fed induction generator (205) is controlled by the DFIG Controller (300) making an effective regulation of the total active power and the total reactive power through the active electronic power converter (222). The power electronic control of the doubly fed induction generator (205) is based on the grid flux orientation (GFO). The exciter machine (212) is regulated by an active electronic power converter (225) and controlled by the Exciter Controller (301). The power transferred to/from the exciter machine (212) is controlled by the active electronic power converter, using as main regulation variable the DC Bus voltage level, measured with the DC Bus voltage sensor (223).

The variable speed wind turbine control system also comprises a pitch control system, which is based on the limitation of the demanded power to the exciter. The Exciter Based Pitch Controller (EBPC) (304) regulates the pitch position of the blades in order to limit aerodynamic power. The EBPC (304) also provides pitch angle set point for OPTC (303) from exciter's power deviation and by measuring the speed and position of pitch motor (305). In addition, EBPC (304) comprises a Collector Anti-Wearing & Lubrication System (CAWLS) in order to protect the collector of the DC machine used for the pitch movement and improve lubrication of blades bearings.

Figure 10:
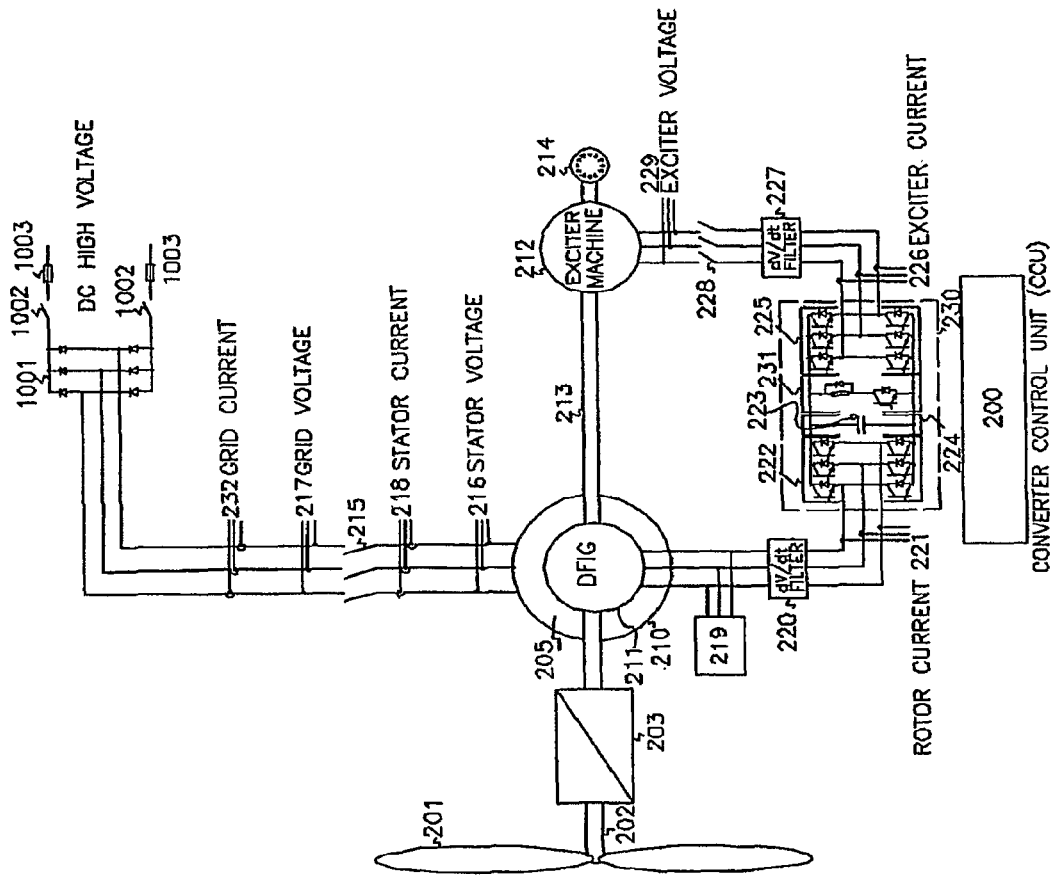
FIG. 10: Illustrates a block diagram of one embodiment of the HVDC wind turbine with high voltage generator and rectifier.
Figure 11:
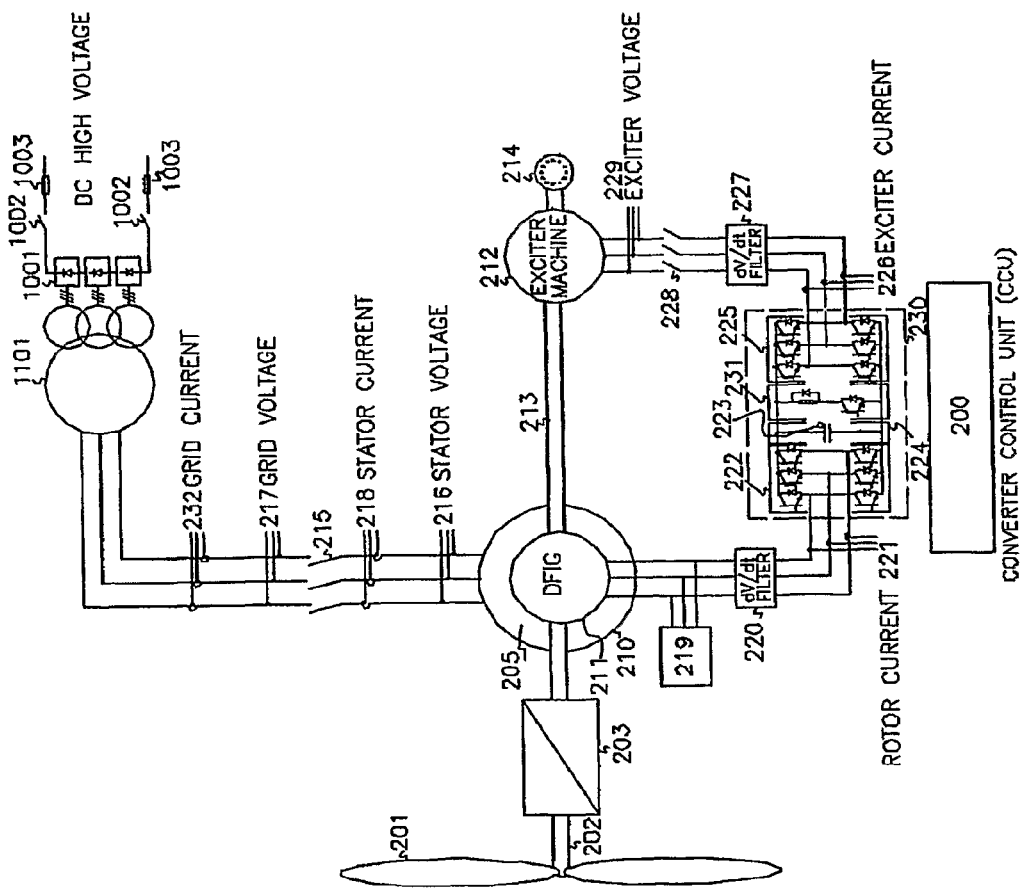
FIG. 11: Illustrates a block diagram of one embodiment of the HVDC wind turbine with low voltage generator, transformer and rectifiers.

The topology of the present invention is also suitable for high voltage DC link transmission (HVDC) in variable speed generation systems. As shown in FIG. 10 and FIG. 11, the DC output can be produced by using a high voltage generator with a rectifier (1001), as shown in FIG. 10, or with a low voltage generator and an additional transformer (1101) with one or more secondaries, as shown in FIG. 11, wherein each secondary is rectified and all of such rectifiers are connected in series or parallel way. Additional connecting devices (1002) and protection devices (1003) are required.

Due to the topology of the present invention, the output frequency of the AC voltage can be fixed, allowing a smaller dimensioning of required rectifiers and transformers and reducing the ripple content of the DC output voltage under low wind conditions, improving the output power quality.

Furthermore, once the wind turbine starts rotating, all the auxiliary systems can be fed by the exciter machine (212), notwithstanding the operation of the main generator, reducing the size of the uninterruptible power supply or of the HVDC to AC converter.

Note that, although grid applications are described, it would be apparent to one skilled in the art that the present invention may also be used for other applications such as stand-alone power systems or any variable speed energy generation system. For example, such other variable speed energy generation systems may include power systems based on wave and tidal energy, geothermal energy, solar energy applications, hydroelectric energy, internal combustion engines, etc.

Optimum Power Tracking Controller (OPTC)

The Optimum Power Tracking Controller (OPTC) (303) adjusts the power reference for the power control loop, performed by DFIG Controller (300), in order to control generator power. This reference is based on measured wind speed as the main regulation variable.

According to this embodiment, a variable speed system wherein a tracking of optimum power coefficient ($C_p$) may be carried out within an operational speed range. This range is determined by a lower speed limit ($\omega_0$) and an upper speed limit ($\omega_1$) and their correspondent lower power limit and upper power limit ($P_0$ and $P_1$ respectively).

Figure 4:
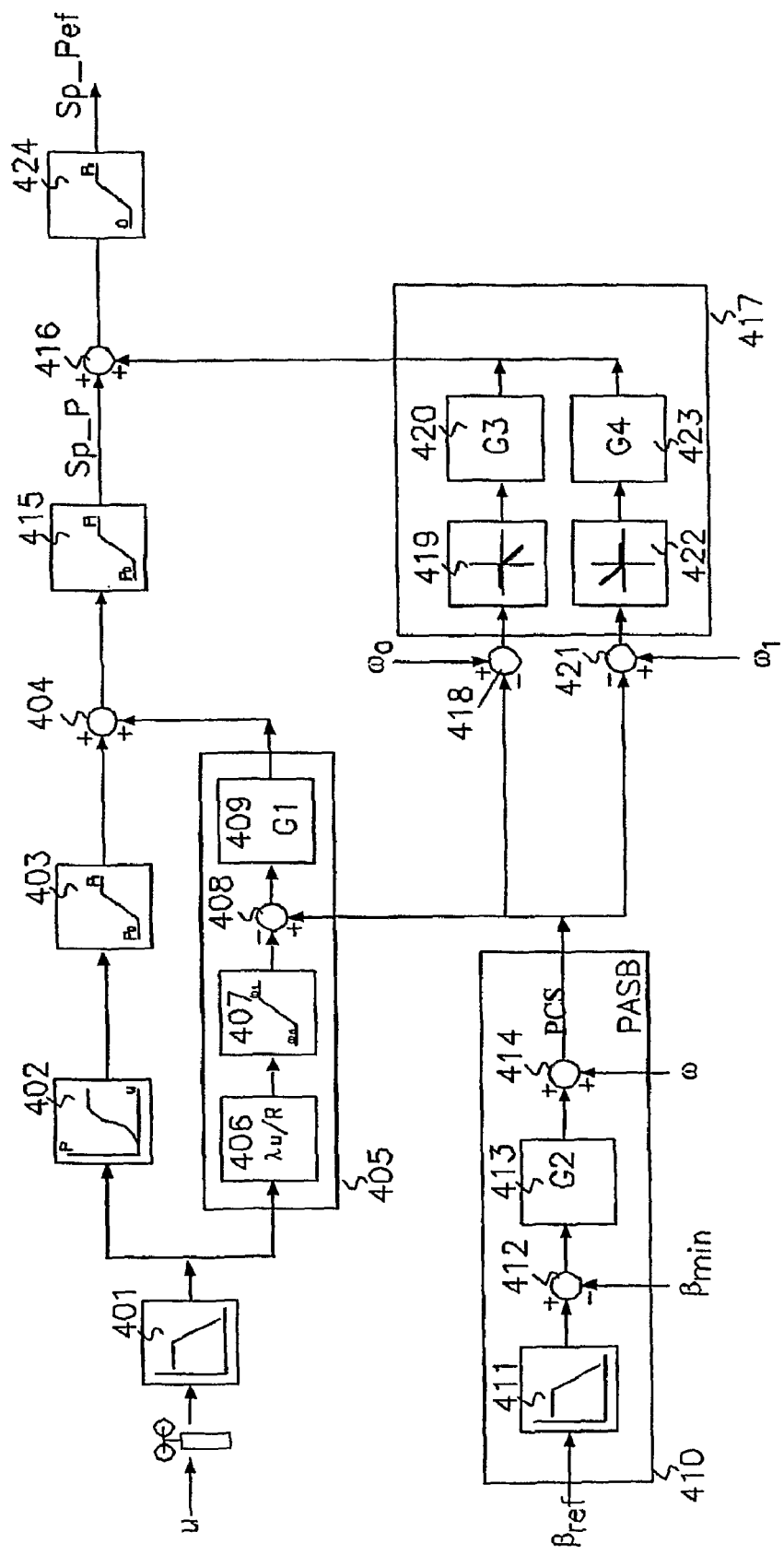
FIG. 4: Illustrates a block diagram of one embodiment of the Optimum Power Tracking Control (OPTC) method.

FIG. 4 illustrates a block diagram of one embodiment for the Optimum Power Tracking Controller (OPTC). The main input of OPTC is the wind speed (u), which is measured by means of one or more anemometers. In one embodiment, this measurement is filtered (401) to avoid undesired frequencies to be amplified through the control system and so that a smooth signal is operated.

OPTC calculates a correspondent power value for each particular wind speed (402). This relationship is determined from the overall characteristics of the wind turbine, the rotor head mainly, and its points correspond to the maximum aerodynamic efficiency. Thus, $C_p$ is maximised to achieve maximum power output. Obtained power value is input to a power range limiter (403). This implementation comprises the main loop.

An auxiliary correction (405) of the main loop is applied to the obtained value to improve the responsiveness of the optimised $C_p$ tracking. Doubly fed induction generator optimum speed is worked out (406) from measured and filtered wind speed signal. The rotor optimum speed (on the low-speed shaft) is the result of dividing the product of optimal tip speed ratio ($\lambda$) and wind speed (u) by the rotor plane radius (R). Doubly fed induction generator rotational speed is calculated by multiplying this value by the gearbox ratio. Obtained speed value is input to a speed range limiter (407). The output of this block is compared (408) with a pitch corrected speed (PCS), calculated in the Pitch Adapted Speed Block (PASB) (410).

Pitch angle reference, minimum pitch angle and measured rotational speed are input to PASB. A gain (413) is applied to the difference between filtered pitch angle set point ($\beta_{ref}$) and minimum pitch angle ($\beta_{min}$). For the coupling, this term is initialised to zero, being $\beta_{ref}=\beta_{min}$. Measured rotational speed ($\omega$) is added to calculate said corrected speed.

After such correction by PASB (408), a gain (409) is applied to the obtained error providing a $\Delta P$ to be added to the previously calculated power set point.

Once the obtained power set point has been corrected (404), the value is input to a power range limiter (415) to ensure that this power reference is within $P_0$ and $P_1$ thresholds. The obtained reference is the power set point (SP_P).

A rotational speed surveillance (417) is finally applied to this power set point. In case PCS is lower than $\omega_0$ (419) a gain or a different controller (420) is applied to such speed difference providing a $-\Delta P$. On the other hand, if PCS is higher than $\omega_1$ (422), a gain (423) is applied to calculated error providing a $\Delta P$, proportional to the speed difference at the input.

Therefore, above detailed correction is applied to the power set point SP_P, which, in addition, is input to a power range limiter (424) in order to ensure that calculated set point does not exceed rated power. Hence, the output of OPTC is the effective power reference SP_Pef to be transmitted to General Controller (302) and hence to DFIG Controller (300) in order to control the doubly fed induction generator power.

Due to Optimum Power Tracking Controller, the output power quality when generator speeds are equal or greater than the generator speed at which rated power occurs is improved. In the prior art variable speed wind turbines with a DFIG configuration, although the stator power remains constant, the rotor power is also fed to the grid through the power converter. Due to the rotor power ripple, the total power fed into the grid is also rippled, affecting the output power quality of the wind turbine. Within the present invention, by using an exciter machine and a power converter not connected to the grid, power is only delivered to the grid through the stator of the doubly fed induction generator, avoiding ripple and improving the output power quality of the wind turbine.

Doubly Fed Induction Generator Controller

The DFIG's stator active power and reactive power control is made by the Doubly Fed Induction Generator's Controller (300). This controller offers a good regulation performance and control of the total power delivered to the grid. This control is based, as it is explained in further detail below, on different regulation loops, totally independent from the electrical parameters of the machine by using the Grid Flux Orientation (GFO). By measuring with a high accuracy the different magnitudes to be regulated, the total power delivered to the grid by the stator (210) of the doubly fed induction generator 205 is perfectly controlled, achieving a high quality energy.

Figure 5:
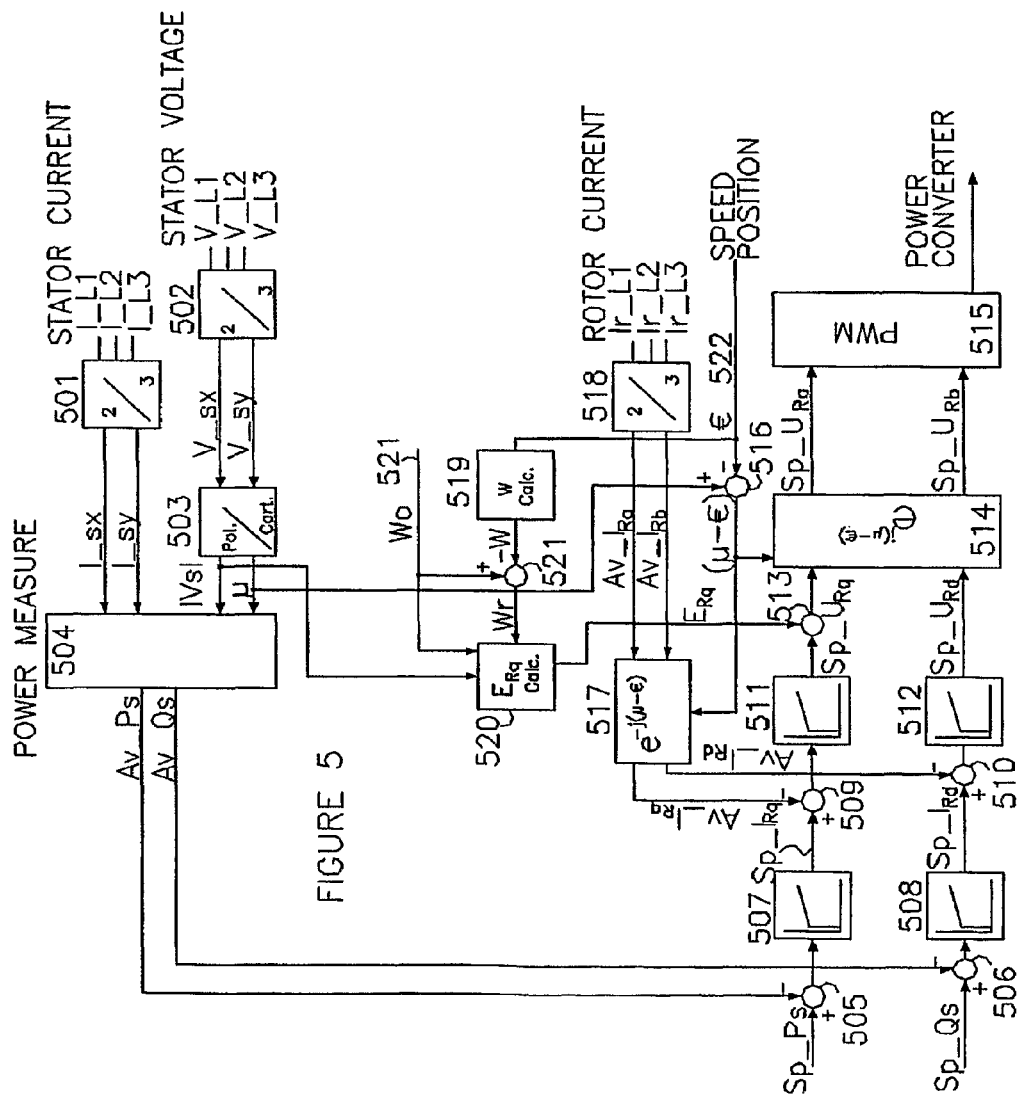
FIG. 5: Illustrates a block diagram of one embodiment of the GFO and the Doubly Fed Induction Generator's Controller.

The Doubly Fed Induction Generator's Controller (300), illustrated in FIG. 5, is based on the Grid Flux Orientation (GFO) control and four regulation loops: Two current loops (Irq, rotor current loop (509), and Ird, rotor current loop (510)) and two power loops (Ps, Stator active power loop (505), and Qs, Stator reactive power loop (506)).

In this exemplary embodiment of present invention, the controller is going to regulate the DFIG's stator active power and reactive power by regulating the rotor currents (Av_Ird and Av_Irq) and, consequently, the total power delivered to the grid. The power controller operates with the current and voltage magnitudes referred to a two axes rotating system (d,q), so the different current and voltage measurements carried out by the system are transformed (514, 517) to the referred rotating (d,q) system.

In one embodiment, by controlling the Av_Ird (rotor current referred to as the 'd' axis), the magnetising level of the doubly fed induction generator (205) is fixed, so the reactive power flow direction in the machine is established. Furthermore, the doubly fed induction generator (205) may work as an inductive system, consuming reactive power, or may work as a capacitive system, generating reactive power. In this embodiment, the control of the Av_Ird is carried out totally independent on the control of the Av_Irq (rotor current referred to 'q' axis). In another embodiment, by controlling the Av_Irq, the active power generated by the doubly fed induction generator and delivered to the grid is perfectly controlled.

Accordingly, the DFIG's stator active power loop (507) regulates the stator power (Av_Ps), by receiving a stator power set point (Sp_Pef) from the OPTC (303) and, hence, (Sp_Ps) from the General Controller (302). This loop may be based on a PI controller or a different controller with a more complex structure. The DFIG's stator active power calculation is described in further detail below. The PI controller (507) output is the rotor current set point (Sp_Irq). The Irq rotor current loop (511) regulates the Av_Irq current with this aforementioned set point. This Irq current loop may be based on a PI controller or a different controller with a more complex structure. The regulator output is the Urq rotor voltage set point (Sp_Urq).

Furthermore, the DFIG's stator reactive power loop (508) regulates the stator reactive power (Av_Qs), receiving a stator reactive power set point (Sp_Qs) from the General Controller (302). This Sp_Qs may be based on a fixed value, SCADA settings or the like. This reactive power loop may be based on a PI controller or a different controller with a more complex structure. The stator reactive power calculation is described in further detail below. The PI controller (508) output is the Ird rotor current set point (Sp_Ird). The Ird rotor current loop (512) regulates the Av_Ird current with this aforementioned set point. This Ird current loop may be based on a PI controller or a different controller with a more complex structure. The regulator output is the Urd rotor voltage set point (Sp_Urd). In one embodiment, this method allows magnetizing of the doubly fed induction generator from the rotor, avoiding reactive power consumption from the grid. Furthermore, controlling the doubly fed induction generator magnetising level, and measuring the grid and stator voltages the system is continuously synchronised to the grid, regarding at every moment the amplitude, the frequency and the angle of the stator voltages generated by the doubly fed induction generator (205). Connection and disconnection systems will be explained below in further detail.

In one embodiment, the AV_Irq and Av_Ird rotor currents are calculated referring the three rotor currents measurement (Ir_L1, Ir_L2, Ir_L3) (121), to a two axes rotational system with a rotational angle ($\mu$-$\epsilon$) where $\mu$ is the grid angle, calculated from the measurement of the three grid voltages (Vg_L1, Vg_L2, Vg_L3) (217), and $\epsilon$ is the rotor angle measured with the position and speed sensor (214).

The Av_Ps and Av_Qs are calculated using Id, Iq, Vd, Vq:

$$Av\_Ps = \frac{3}{2}(Vsd \times Isd + Vsq \times Isq) \qquad \text{Eq. 1}$$

$$Av\_Qs = \frac{3}{2}(Vsq \times Isq - Vsd \times Isd) \qquad \text{Eq. 2}$$

where Vsd, Vsq, Isd, Isq are obtained by measuring the three stator voltages (V_L1, V_L2, V_L3) (216) and the three stator currents (I_L1, I_L2, I_L3) (118), and referring these voltages and currents to a two axes rotational system, using the $\mu$ rotational angle.

Both current regulator outputs, Sp_Urd and Sp_Urq, are transformed into a fixed system, using the rotating angle ($\mu$-$\epsilon$), obtaining the three voltage references to be imposed in the rotor (211) of the doubly fed induction generator (205). Block 414 shows the transformation of the rotor voltages, from a two axes rotational system to a three phase fixed system. In one embodiment, these rotor voltages may be used as reference to a module for generating the triggering of the active switches of the power electronic converter (222). Block 415 shows the module where different PWM techniques may be implemented.

According to this embodiment, an electronic power control system based on two power loops and two current loops, independent on the machine electrical parameters, avoids the effects of the electrical parameter dispersion or the theoretical modeling errors in the power regulation. Errors caused by the electrical parameters change because of temperature oscillations or saturation effects due to the non linearity and are avoided by this method. Thus, a very good quality energy generation is obtained, fulfilling and improving the requirements of the different normative. Only different measurements are necessary to make the regulation (I_L1, I_L2, I_L3, V_L1, V_L2, _L3, Ir_L1, Ir_L2, Ir_L3, ϵ, ω). In one embodiment, the reactive power regulation could be made independent of the active power regulation.

Exciter Controller

In one exemplary embodiment, the variable speed system comprises a doubly fed induction generator (205) wherein the rotor (211) is connected to an electronic power converter (222). This electronic power converter is coupled through a DC Bus system (224) to a second electronic power converter (225). In one embodiment, this frequency converter (power converter) (225) is connected by contactor (228) to the exciter machine (212). The exciter machine, such as an asynchronous machine, a DC machine or a synchronous (e.g. permanent magnet) machine or a reversible electrical machine, is mechanically coupled to the drive train.

Depending on the rotor speed, the power demanded to the exciter machine may be positive or negative, according to the direction of the rotor energy flow. During the subsynchronous operation, i.e. below the synchronous speed, power flows from the exciter machine (212) to the rotor (211) of the doubly fed induction generator (205), so that the exciter machine (212) acts as a generator. During the supersynchronous operation, i.e. above the synchronous speed, the power flows from the rotor (211) of the doubly fed induction generator (205) to the exciter machine (212), therefore the exciter machine (212) acts as a motor. The power balance during the whole range speed is such that power generated/consumed in the exciter machine is consumed/generated in the rotor of the doubly fed induction machine, except for the losses in the different elements.

In this embodiment of the present invention, the exciter machine (212) is regulated by the electronic power converter (225) and controlled by the Exciter Controller (301). The control system of the exciter machine (212) is described below referring to the exciter machine as a permanent magnet machine. It should be apparent to one skilled in the art that different type of machines may be used as an exciter machine (212), so the exciter controller may modified accordingly.

Figure 6:
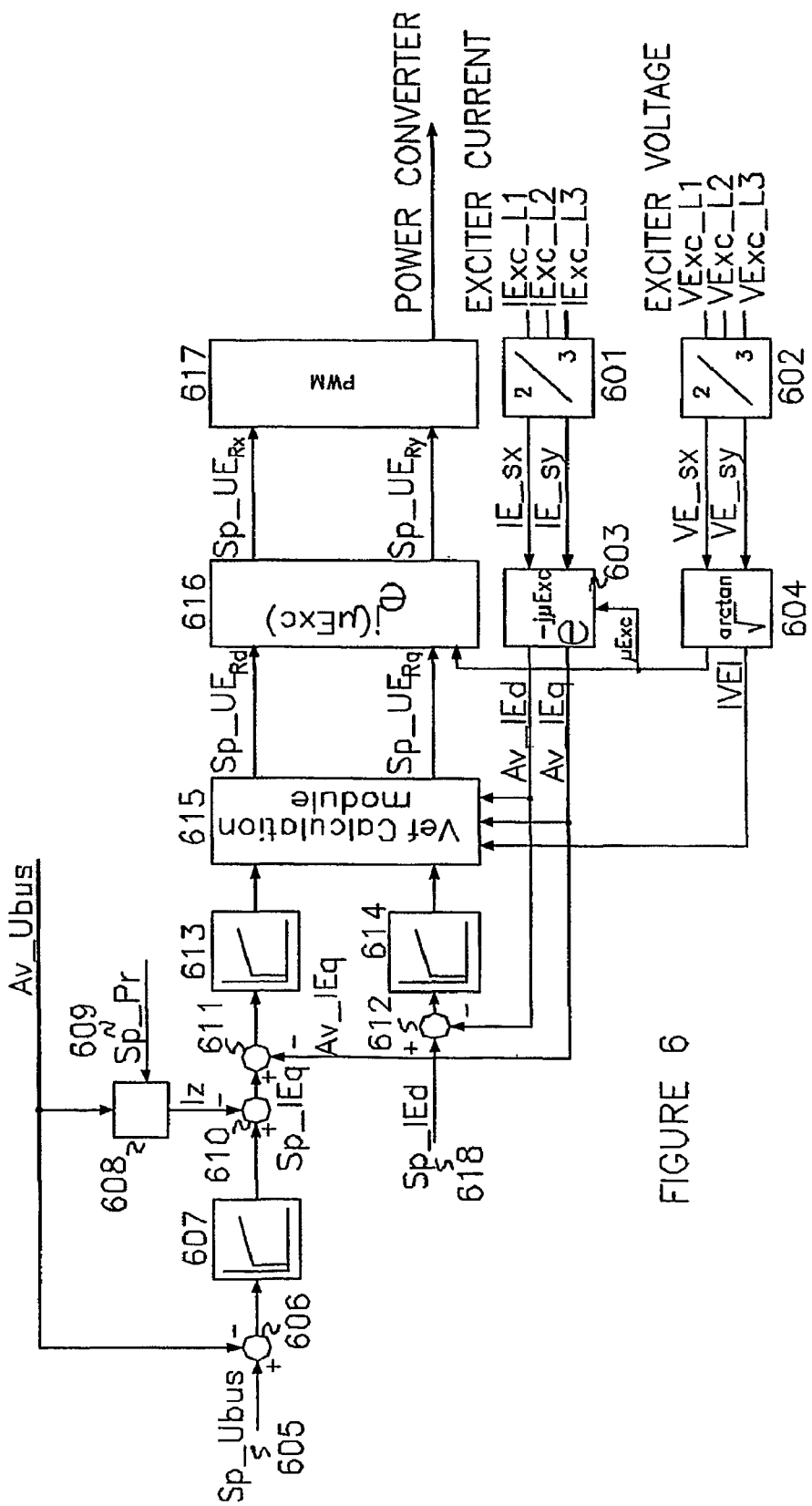
FIG. 6: Illustrates a block diagram of one embodiment of the Exciter Machine Controller.

Power transferred to/from the exciter machine (212) is controlled by the electronic power converter (225), using as main regulation variable the DC Bus voltage level, Av_Ubus. FIG. 6 describes one embodiment of the exciter machine regulation. The Converter Control Unit (200) fixes a DC Bus set point voltage Sp_Ubus (605) which may be variable or static. By measuring the DC Bus voltage, the DC Bus voltage set point is regulated by a PI controller (607) or a different controller with a more complex structure. This controller establishes the active power to be transfer between the permanent magnet exciter machine (212) and the DC link Bus (224) in order to keep the DC Bus voltage at the value fixed by the Converter Control Unit (CCU). This active power is determined by the Sp_IEq. In one embodiment this Sp_IEq is calculated from two terms:

$$Sp\_IEq = \text{Bus voltage regulator}(607)\text{output} + \text{Decoupling\&switching on compensation}(608)\text{output} \qquad \text{Eq. 3}$$

where the first term responds to possible Bus oscillations and the second term, Iz, is a feed forward term which represents the estimated current circulating through the Bus. With this type of structure it is possible to achieve high dynamic power response of the permanent magnet machine. In one embodiment, the Bus current estimation term does not exist, so the Bus voltage regulator (607) is taking charge of generating the effective Sp_IEq demanded to the permanent magnet exciter machine.

In this embodiment, the Sp_IEq is regulated by a PI controller (613) or a different controller with a more complex structure, using the Av_IEq which represents the exciter machine active current referred to a two axes rotating system. In one embodiment, a permanent magnet machine may be used, so a field weakening module is required to be able to reduce the machine flux and to have a better power regulation at high speed. In a permanent magnet machine the stator voltage depends on the rotor speed and on the machine magnet flux. Consequently, above a rotor speed is necessary to reduce the stator voltage by reducing the flux on the machine.

In one embodiment a field weakening system is implemented, establishing a reactive current set point, Sp_IEd (618) which is going to be demanded to the permanent magnet exciter machine (212). In this way, independent on the rotor speed, the voltage generated by the permanent magnet is controlled and placed in the band range regulation capability of the electronic power converter (225). The Sp_IEd (618) is regulated by a PI controller (614) or a different controller with a more complex structure, using the Av_IEd which represents the exciter machine reactive current referred to as a two axes rotating system.

In one embodiment, the Sp_IEd fixes the magnetising level of the machine, and its voltage level. The Sp_IEq fixes the active power injected or demanded to permanent magnet machine.

In one embodiment, two or three exciter machine phase currents may be measured (IExc_L1, IExc_L2, IExc_L3) in order to calculate Av_IEd and Av_IEq. The three currents are initially transformed (601) to a two axes static system so IE_sx and IE_sy are obtained. Secondly, these two currents are referred (603) to a two axes system which rotates with the permanent magnet machine total flux, obtaining Av_IEd and Av_IEq. This current transformation is made by using the angle μExc, obtained from the three or two exciter machine phase voltages which may be measured or estimated (VExc_L1, VExc_L2, VExc_L2). Blocks 602 and 604 show how the permanent magnet machine flux and voltage absolute values are obtained.

In one embodiment an Effective Voltage calculation module (615) is required because the voltage to be generated by the electronic power converter (225) must rely on the flux interaction in the permanent magnet machine due to the effect of current circulation. So, voltage set points Sp_UErd and Sp_UErq are calculated (615) from the two PI current regulators (613, 614) outputs and from Av_IEd, Av_IEq and |VE|.

The two voltage set points, Sp_UErd and SP_Uerq, are transformed (616) into a three axes static system, using the rotating angle μExc. Thus, the voltage references Sp_UE_Rx and Sp_UE_Ry are obtained to be imposed in the stator of the permanent magnet exciter machine (212). In one embodiment, these voltage set points may be used as references to a module for generating the triggering of the active switches of the power electronic converter (225). Block 617 shows the module where different PWM techniques may be implemented. In one embodiment, a dV/dt filter or any other kind of filter (227) may be installed between the electronic power converter (225) and the exciter machine (212).

In one embodiment, the exciter machine (212) may be used to supply energy to different elements of the wind turbine, using this machine as an Auxiliary Power Supply. Grid disturbances or faults do not affect the power electronic converter (225). Consequently, the exciter power regulation is not affected.

Dynamic Electric Brake

According to another embodiment, a Dynamic Electric Brake (DEB) is provided that allows the wind turbine to apply an electric brake to stop the generator. Therefore, mechanical strengths in wind turbine components, which may cause premature damages, may be avoided.

The variable speed wind turbine of present invention comprises a doubly fed induction generator (205) where the rotor (211) is connected to an electronic power converter (222). This electronic power converter (222) is coupled through a DC Bus system (224) to a second electronic power converter (225). This frequency converter (electronic power converter (225)) is connected to the exciter machine (212). The exciter machine, such as an asynchronous machine, a DC machine, a synchronous (e.g. permanent magnet) machine or a reversible electrical machine, is mechanically coupled to the drive train. The system also comprises an electric brake circuit (231), such a DC chopper, connected to the DC Bus.

Within prior art DFIG topologies, if the stator power of the DFIG decreases abruptly due to a grid fault or a disconnection from the grid, the machine tends to speed up. In the case of a wind turbine operating at rated power, the machine may suffer an overspeed. Usually, it is not possible to use electric brake in such moment, because the DFIG's stator power and, furthermore, the DFIG's rotor power may be too low. However, due to the topology of the present invention, the exciter machine power can be used to drive an electric brake. In this case, the exciter machine will be used as generator and, hence, power can be transferred from the exciter machine to the direct current Bus. Thus, part of the electric power is drained in the rheostat of the chopper connected to the DC Bus avoiding overspeed of the generator. In such a way, the wind turbine braking does not solely depend on the mechanical brake. In one embodiment, an electric brake may be used together with mechanical brake, allowing the wind turbine to brake progressively, minimizing mechanical strengths, peak torque loads and undesired accelerations. For instance, the electric brake may be applied until mechanical or aerodynamic brake is able to take the control of the turbine.

Therefore, due to the exciter machine (212), braking power is always available. Depending on the exciter power, the exciter converter power, and the rheostat value of the chopper, braking power could reach, in an embodiment, 30% of generator's rated power.

Thus, there is also a maximum braking power ($P_{b\_MAX}$) continuously available:

$$P_{b\_MAX} = (V_{DC\_bus})^2 / R_{brake} \qquad \text{Eq. 4}$$

wherein $V_{DC\_bus}$ is the actual value of DC Bus voltage ($Av\_U_{bus}$)

Braking power may be controlled in such a way that when wind turbine is working at low speeds only a minor part of braking power is needed. However, if wind turbine generator is above rated speed it may be necessary to use the whole braking available power. Thus, a set point of braking power ($SP\_P_b$) is worked out depending mainly on measurements of wind speed and generator speed.

In order to control the necessary braking power accurately, a modulation factor ($f_{MOD}$) is calculated. This modulation factor is applied to the maximum braking power available in each moment ($P_{b\_MAX}$) to obtain the $SP\_P_b$.

$$SP\_P_b = P_{b\_MAX} \cdot f_{MOD} \qquad \text{Eq. 5}$$

$$f_{MOD} = SP\_P_b \cdot (R_{brake}/(Av\_U_{bus})^2) \qquad \text{Eq. 6}$$

The modulation factor allows an accurate control of the braking power. A progressive electric braking is possible to apply. For example, in an emergency stop of the wind turbine, at the beginning, the whole braking power is needed. Once mechanical braking, such as blade pitching, is activated, it is possible to progressively decrease the electric braking.

The Dynamic Electric Brake, in this exemplary embodiment, is composed of a rheostat (resistor, set of resistors or whatever dissipative element) activated by an electronically controllable switch (e.g. an IGBT). Anti-parallel diodes may be also used. DEB is not strictly limited to the embodiment which has been described. Thus the braking chopper may comprise elements different from those indicated above.

Connection (Enable) Sequence

Figure 7:
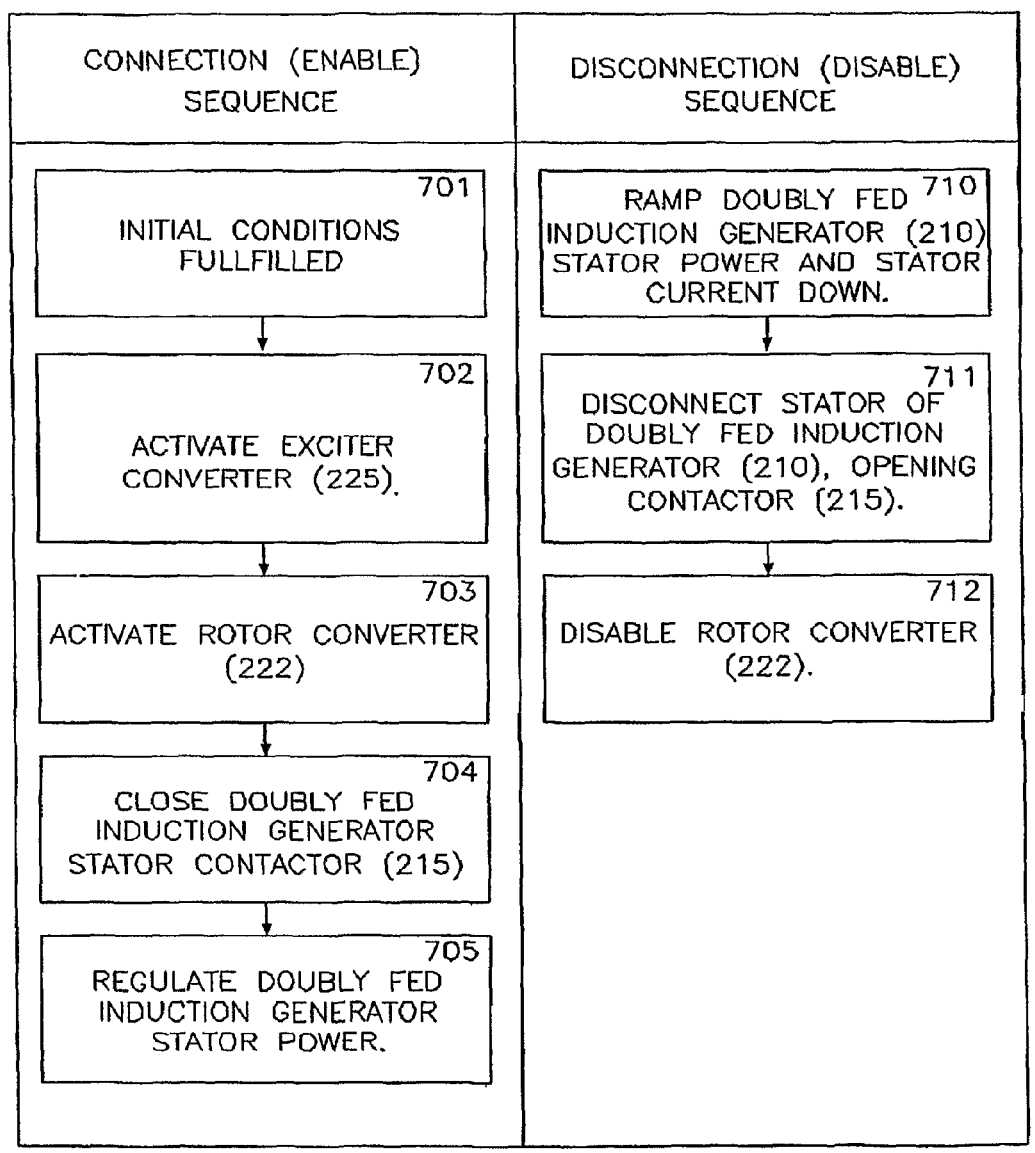
FIG. 7: Illustrates a flow diagram of one embodiment of the synchronization, connection and disconnection sequence.

A connection sequence is provided according to another embodiment. This embodiment comprises a doubly fed induction generator (DFIG) (205) coupled to an exciter machine (212) with no power electronic converter connected to the grid and a connection sequence that allows connection of the doubly fed induction generator to the grid with no consumption of reactive energy and no connection current peaks through contactor (215), thus, increasing the lifetime of the contactor (215). FIG. 7 shows the connection sequence. It would be apparent to one skilled in the art that the techniques described here can also be applied if a main circuit breaker or any other switch, instead of contactor is used to couple the generator to the grid.

During normal operation Mode, the turbine is continuously orienting towards the wind with the use of the yaw motors. When the measured average wind speed is greater than a threshold (in one embodiment 2.5 meters per second), if all the rest of required conditions are fulfilled, the blades are moved by the pitch motor to a position that allows the main rotor to start rotating.

In one embodiment, the initial conditions must be fulfilled before starting the connection sequence (701). These conditions involve the rotor speed, the state of the rotor contactor (228) and any other previous conditions to start the sequence. In one embodiment, once these conditions are fulfilled the rotor speed must go up to N1 (in one embodiment, with a 1800 rpm/60 Hz synchronous speed DFIG, the N1 value might be 1170 rpm). Once this rotor speed is reached, the exciter side electronic power converter (225) is activated in order to regulate the DC Bus voltage level, corresponding to state 702.

In one embodiment, once the DC Bus has reached the VBUS1 level, the rotor speed must go up to N2>=N1 (in one embodiment, with a 1800 rpm/60 Hz synchronous speed DFIG, the N2 value might be 1260 rpm, and the VBUS1 level, with 1700V IGBT, might be 1050V). The DFIG side electronic power converter (222) is then switched on (703) in order that voltage through contactor (215) comes near 0; This is accomplished by magnetizing the doubly fed induction generator (205) through the rotor (211) with the electronic power converter (222), in a way that voltage value, sequence, frequency and other variables are equal in both sides of the contactor (215). When the conditions of voltage amplitude, voltage frequency, voltage angle/delay and some other conditions are fulfilled, the contactor (215) is closed (704) and stator current is near 0. There is no consumption of energy from the grid by the doubly fed induction generator (205), and possible perturbations on the grid are avoided.

Once this sequence has been fulfilled, power control is activated (705). To allow a smooth connection to the grid, the active power set point from the OPTC, and the reactive power set point from the main controller are ramped up during the initial moments.

During all the connection sequence, the status of all the involved elements is monitored in such a way that if an error is detected, the sequence is resumed and an alarm is generated. Depending on the type of alarm, the sequence can start a predetermined time later, or if the error is important, one emergency mode is activated in the wind turbine which requires human intervention to exit that mode.

Figure 9:
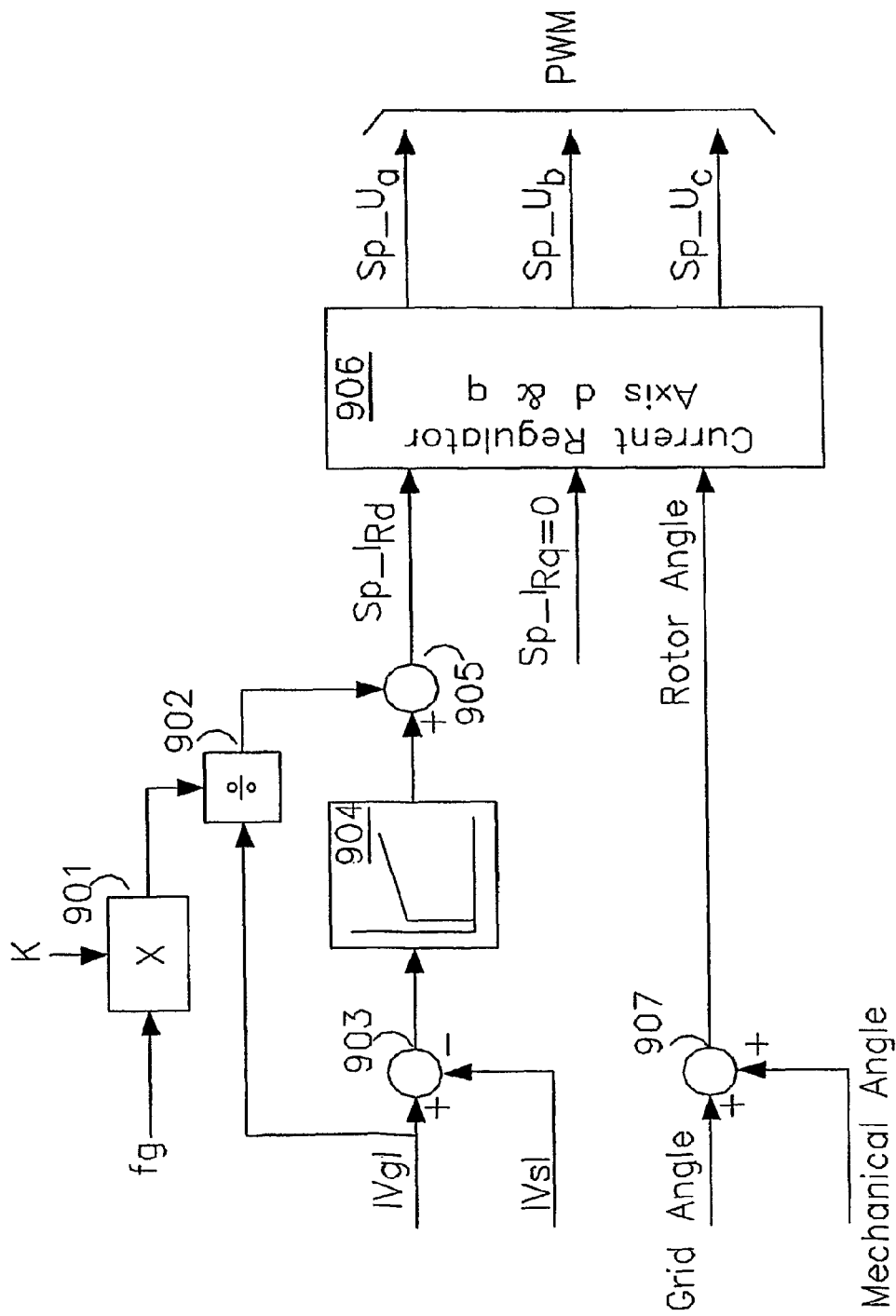
FIG. 9: Illustrates a block diagram of one embodiment of the voltage regulation mode used during synchronization.

The control system used during state 703 for synchronization is described in FIG. 9. A stator voltage regulation is performed. The stator voltage and the grid voltage are the inputs to the stator voltage regulator (903 and 904), and the output of this regulator is part of a rotor current set point in axis d. A current term proportional to the magnetizing current of the generator is added to the output of the voltage regulator as a feed-forward element. Such current feed-forward is calculated according to the measured grid voltage, measured grid frequency and to a K constant that depends on the electrical parameters of the generator. With the addition of this feed-forward term within block 905, the synchronization process is sped up. The sum of both terms, which is the output of block 905, is the rotor current set point in the "d" axis. During all the synchronization process, the set point of rotor current in the "q" axis is equal to 0. Both current set points (in the "d" axis and the "q" axis) are the inputs to a current regulation block (906), wherein they are controlled with PI regulators. The angle used for the conversion of a two axis system ("d" and "q") into a 3 phase system in block 906, is calculated on the basis of the grid angle and the mechanical angle in block 907.

Disconnection (Disable) Sequence

A disconnection sequence is provided according to another embodiment of the present invention. This embodiment comprises a doubly fed induction generator (DFIG) (205) coupled to an exciter machine (212) with no power electronic converter connected to the grid and a disconnection sequence that allows disconnection of the doubly fed induction generator (205) from the grid without any perturbation related to overcurrents or over-voltages on the different elements of the system. Due to the opening of the contactor (215) in near 0 current, the lifetime of this contactor is increased and maintenance operations are reduced. It also allows a lower rating of the contactor for the same application, compared with other disconnection sequences.

In normal operation of the wind turbine, this sequence is usually reached because of absence of wind conditions, but it can be also reached in case of excessive wind, local human request, remote Supervisory Control and Data Acquisition (SCADA) request, a fault in any subsystem of the wind turbine or any other reason.

In one embodiment, the stator power and stator current must be decreased with a ramp in order to have no current in the generator's stator (710). The ramp down time is optimized according to the reason of the disconnection sequence request. In order to avoid unnecessary mechanical stress in the wind turbine, the ramp down time is the maximum that allows a safe operation of the wind turbine. It is evident that ramp down time requirements are not the same for every situation.

Once that state (710) has been fulfilled the main contactor (215) is opened, reaching (711) state. As Active and Reactive Power Set Points are 0 prior to opening the contactor (215), the DFIG Controller (300) is injecting the magnetizing current to have the DFIG stator grid connected but without current, so that the opening of the contactor is made with near 0 current, extending the lifetime of the contactor (115).

When the (711) state is fulfilled the rotor electronic power converter (222) is disabled, corresponding to the (712) state. When the rotor electronic power converter is disabled, the energy stored in the inductive circuits of the doubly fed induction generator is transferred to the DC link.

Exciter Based Pitch Controller (EBPC)

Figure 8:
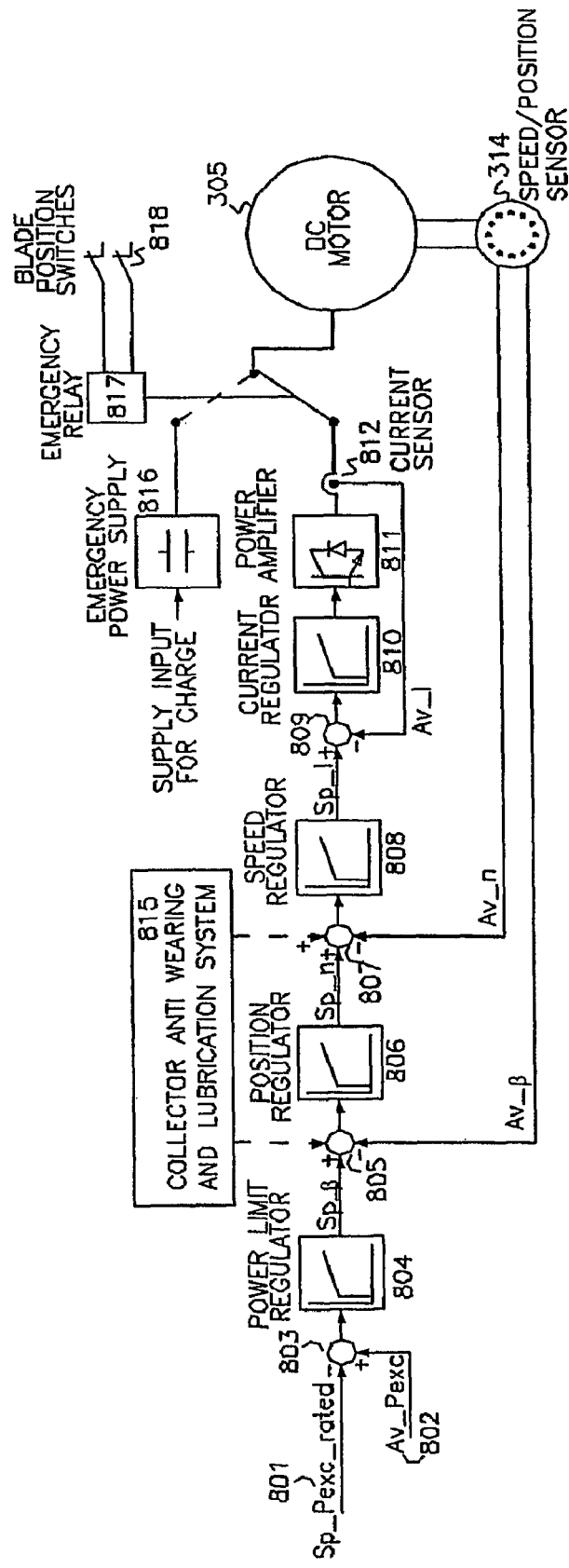
FIG. 8: Illustrates a block diagram of one embodiment of the pitch control system.

In this embodiment of the present invention, the variable speed wind turbine comprises an Exciter Based Pitch Controller (EBPC). FIG. 8 describes one exemplary embodiment of such a pitch control system, which is based on the limitation of the demanded power to the exciter.

Pitch control system main magnitude is the power of the exciter. An exciter rated power value (801) is established. An exciter power limiter regulator (804) fixes, from this reference, a blade position set point (Sp_β) depending on the exciter power actual value (802). In one embodiment, when wind turbine's power output remains below the rated power, the Sp_β will take low values (for example between 0° and 2° and once the rated power is reached the Sp_β will increase in order to limit the exciter power.

In one embodiment, the blade pitch position output of 804 is regulated by a PI position controller (806) or by a different controller with a more complex implementation. The error that is input to the PI position controller is:

$$\text{Error\_}\beta = Sp\_\beta - Av\_\beta \qquad \text{Eq. 7}$$

The Av_β is the blade position actual value which is measured by the position and speed sensor (214). The position regulator output is the pitch speed set point (Sp_n). Blades will move at such speed to reach requested position.

In one embodiment, the pitch speed output of 806 is regulated by a PI speed controller (808) or by a different controller with a more complex implementation. The error that is input to the PI speed controller is:

$$\text{Error\_}n = Sp\_n - Av\_n \qquad \text{Eq. 8}$$

The Av_n is the actual value of the blade speed which is measured by a speed sensor (214). The speed regulator output is the current set point to be demanded to the DC Motor (305) in order to reach requested speed (Sp_n).

In one embodiment, the current output of 808 is regulated by a PI current controller (810) or by a different controller with a more complex implementation. The error that is input to the PI current controller is:

$$\text{Error\_}I = Sp\_I - Av\_I \qquad \text{Eq. 9}$$

The Av_I is the actual value of the DC Motor current which is measured by a current sensor (812). The current controller output is the reference voltage to be imposed in the DC Motor. In one embodiment, these reference voltages may be created through different PWM techniques, triggering the active switches of the power electronic converter (811).

In one embodiment, in case of an emergency, pitch motor drive is switched from EBPC to the Emergency Power Supply (EPS). Therefore, driven motor is directly fed by the EPS (816), through the emergency relay (717) until the feathered position is reached (close to 90°. The blade position switches (818) determine the end of current supply from the EPS.

In one embodiment, the drive to move the blade is a DC motor. It would be apparent to those skilled in the art that an AC induction motor or an AC synchronous motor can also be used.

In one embodiment, the drive to move the blade could be a hydraulic, pneumatic or other type of pitch actuator controlled by a servo valve that integrates the functions (807, 808, 809, 810, 811).

Collector Anti-Wearing & Lubrication System (CAWLS)

In another embodiment of the present invention the variable speed wind turbine comprises a pitch control system based on the limitation of the demanded power to the exciter machine.

In the case that DC motors (305) are used as drives for the pitch movement, a Collector Anti-Wearing & Lubrication System (CAWLS) (815) is applied to avoid further harmful effects of keeping a fixed pitch position for a long period of time. For instance, premature wearing of collector and brushes of the DC motor (305) due to current passing through the same position can be avoided. Furthermore, lubrication of blades bearings is remarkably improved.

Thus, the CAWLS is implemented to avoid premature wearing of the collector and brushes of the DC motor (305) used as pitch drive and to improve lubrication of blades bearings. In one embodiment, this system is based on the introduction of a non significant additional set point of position or speed, in such a way that the pitch angle is continuously moving around the desired position or blade position setpoint (Sp_β). Pitch angle variation is commanded according to a sinusoidal wave reference wherein the amplitude and frequency are determined from different parameters. Especially, the frequency should be specified taking into account wind turbine's natural frequencies and fatigue considerations. In one embodiment, such a sinusoidal wave reference is designed with, for example, a period of one minute and an amplitude of 0.2°. It would be apparent to those skilled in the art that whatever other wave form, period or amplitude may be applied. CAWLS implementation does not affect the power production of the wind turbine at all, but it does avoid the wearing of the collector and brushes, and improves their cooling and greasing. CAWLS also improves lubrication of blades bearings.

Furthermore, this system may be used in any kind of pitch drive to improve the lubrication of blades bearings, increasing the lifetime of these components.

Thus, a variable speed wind turbine with a doubly fed induction generator, an exciter machine and an intermediate power converter, which is not connected to the grid, are disclosed. The invention also describes a power control and a pitch regulation.

Wind power generation has increased considerably worldwide. Growth is widely forecast to continue into the coming decades, even as the industry and technology have arisen to a mature level in this field. As wind farms grow in size and the total base of installed wind capacity continues to increase, the importance of improving the quality of power output is a challenge of huge importance.

Many novelties are introduced within the above described exemplary embodiments of the present invention. An exciter machine is included in the power system wherein the power converter is isolated from (not connected to) the grid. Therefore, the invention provides a solution to most common problems caused by grid connected variable speed wind turbines, such as harmonic distortion, flicker and ripple existence in delivered power. Hence, output power quality is remarkable improved. Within these embodiments power output is accurately controlled and, in addition, it remains constant above rated speed avoiding power fluctuations dependent on wind speed variations. Indeed, the exemplary embodiments provide a friendly connection and disconnection method avoiding reactive power consumption from the grid. Furthermore, power generation according to the embodiments of the present invention is less sensitive to grid disturbances, such as grid faults, and provides a better performance in stand-alone and weak grids. Thus, the system illustrated by the exemplary embodiments is especially attractive for the emerging wind park demands by allowing wind farms to grow in size and installed wind capacity, fulfilling the requirements of the different rules and improving power output quality.

In addition, the exemplary embodiments may include some other benefits such as: the use of the exciter machine as an auxiliary power supply in case of being a permanent magnet machine, the possibility of generating power in medium voltage with a low voltage power converter without power transformer need, simplification of the electrical components, and the prevention of wear in a DC motor collectors when such a motor type is used to pitch the blades and the improvement of blades bearing lubrication.

Alternative embodiments to the wind turbine system shown in FIG. 2 are also possible. The exciter machine (212), for example, could be connected or placed anywhere within the drive train of the wind turbine. Another embodiments including two or more exciter machines are also feasible.

From the above description, it will be apparent that the present invention described herein provide a novel and advantageous variable speed wind turbine. Nevertheless, it must be borne in mind that foregoing detailed description should be considered as exemplary. The details and illustrations provided here are not intended to limit the scope of the invention. Moreover, many modifications and adaptations can be carried out and equivalents may be substituted for the methods and implementations described and shown herein. Consequently, the invention may be embodied in other different ways without departing from its essence and scope of the invention and it will be understood that the invention is not limited by the embodiments described here.

What is claimed is:

1. A wind turbine system comprising:
a first rotor shaft including at least one blade;
an electrical generator;
a pitch control system to control a pitch angle of the at least one blade; and
an exciter machine coupled to a shaft of the generator,
wherein a pitch angle setpoint for the pitch angle is based on the exciter machine power.

2. A variable speed wind turbine system comprising:
a rotor including at least one blade;
a drive train coupled to the rotor, the drive train including at least a doubly fed induction generator (DFIG), said DFIG having at least a stator connectable to a power grid;
at least an exciter machine coupled to the drive train; and at least a power conversion device isolated from the grid and electrically coupled to a rotor of the doubly fed induction generator and to the exciter machine to transfer electrical power between the rotor and the exciter machine, and a pitch control system to control a pitch angle of the at least one blade, wherein the pitch angle is controlled to a total pitch angle setpoint which is based on base pitch angle setpoint and a varying pitch angle setpoint, wherein the base pitch angle setpoint is set based on the power consumed or generated by the exciter machine.

3. The variable speed wind turbine system according to claim 2, wherein the pitch control system controls the varying pitch angle setpoint to vary continuously.

4. The variable speed wind turbine system according to claim 3, wherein the varying pitch angle setpoint varies from the base pitch angle setpoint following a periodic waveform according to an amplitude and a frequency.

5. The wind turbine systems according to claim 4, wherein the periodic waveform is a sinusoidal waveform.

6. A method of controlling a pitch angle of a blade in a wind turbine, the method comprising:

determining a base pitch angle setpoint based on operating parameters of the wind turbine;

determining a varying pitch angle set point that varies with time independent of the operating parameters; and setting the pitch angle of the blade based on the base pitch angle setpoint and the varying pitch angle set point, wherein the base pitch angle setpoint is based on an exciter machine power setpoint.

7. The method of controlling a pitch angle setpoint according to claim 6, wherein the pitch angle is set by adding the varying pitch angle to the base pitch angle.

8. The method of controlling a pitch angle setpoint according to claim 6, wherein the varying pitch angle set point varies following a sinusoidal or any other periodic waveform over time.

* * * * *